E. G. RUPERT.
TIRE CORE BINDER.
APPLICATION FILED APR. 27, 1920.

1,369,549.

Patented Feb. 22, 1921.

Inventor
Edward G. Rupert,
By
Attorney

UNITED STATES PATENT OFFICE.

EDWARD GIDEON RUPERT, OF TRENTON, NEW JERSEY, ASSIGNOR OF ONE-HALF TO DONALD W. RUPERT, OF TRENTON, NEW JERSEY.

TIRE-CORE BINDER.

1,369,549.  Specification of Letters Patent.  Patented Feb. 22, 1921.

Application filed April 27, 1920. Serial No. 376,963.

*To all whom it may concern:*

Be it known that I, EDWARD GIDEON RUPERT, a citizen of the United States of America, residing at Trenton, in the county of Mercer and State of New Jersey, have invented new and useful Improvements in Tire-Core Binders, of which the following is a specification.

In the ordinary method of tire construction, it is common practice to employ a knock-down or break-down core of wood, metal or equivalent material, comprising a plurality of separable sections or members including what is known as the wedge or guide member, adapted when in assembled relation to form a complete circular core upon which the tire composed of rubber fabric is completed and formed and which after the completion of the vulcanizing step in the procedure is broken down or disassembled and withdrawn from the tire.

Various means have been devised and employed for maintaining the sections or members of the core in their assembled relation during the building or vulcanizing of the tire, and each of the structures thus employed has been shown to contain one or more objections such as initial cost of production, uncertainty as to maintaining a proper alinement or positioning of the members or sections of the core, lack of durability, difficulty in assembling or releasing the members or sections, the possibility of the retaining means becoming displaced particularly after a limited use of the device, the liability of employing a multiplicity of small fastening devices, the liability of breakage under rough usage to which a device of this type is ordinarily subjected, and the like, and it is the purpose to avoid these objections and particularly to provide a combination involving a small initial cost, and a means which will insure the accurate alinement and substantial locking of the members or sections of the core in their proper relations and the durability of the locking means, to the end that said means may have a life and period of usefulness at least equal to the core. With these objects in view, the invention consists of the construction and combination of parts, of which a preferred embodiment is shown in the accompanying drawings, wherein:—

Figure 1:
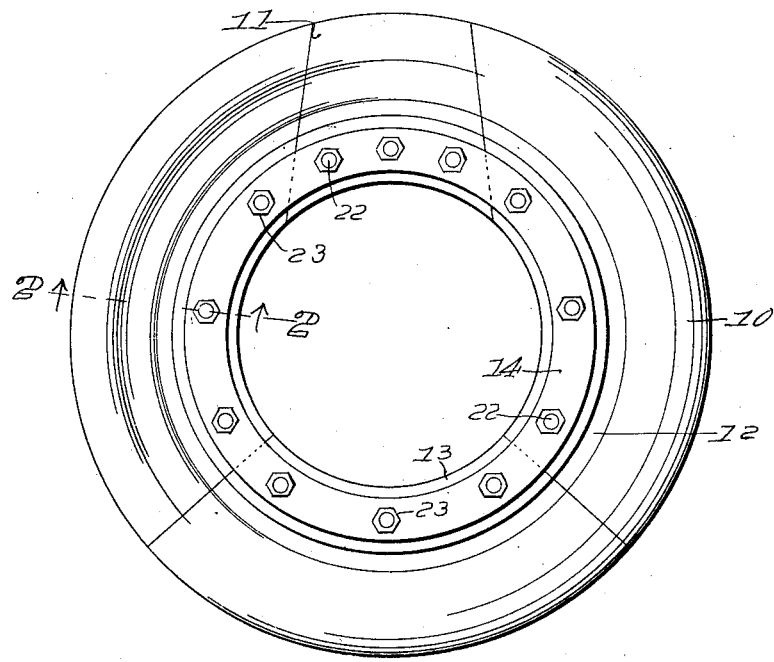
Figure 1, is a side view of a core provided with the tire ring or element embodying the invention.

The core embodies the members or sections 10 and the wedge or guide member 11 provided with the reduced tongue 12 which is enlarged to form the annular rim 13, and in construction is similar to those now in common use, associated with said rim is a means for securing the members or sections of the mold in their assembled relation consisting of a binder ring 14 of endless construction transversely or cross-sectionally tapered to form outer and inner beveled or cam surfaces 15 and 16 for coöperation with beveled or cam surfaces 17 and 18 constituting the upwardly divergent outer and inner walls of a channel 19 formed in the annular rim 13.

The binder ring 14 is perforated as at 20 in registration with openings 21 in the rim for the reception of binder bolts 22 fitted with assembly nuts 23, said bolts extending transversely through the binder ring and annular rim and preferably being arranged in pairs with a bolt on each side of the plane of the edge joint between the joining members or sections of the core.

Figure 2:
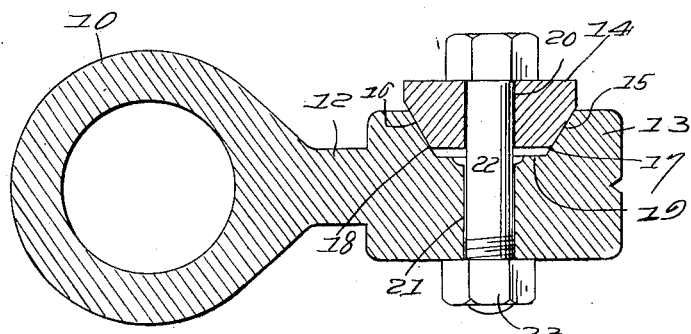
Fig. 2, is a transverse sectional view of the same on the plane of the line 2—2 of Fig. 1.

The effect of the seating of the binder ring and its tightening by means of the bolts is to center and adjust the core members or sections so as to secure accurate alinement or the registration thereof to the end that special care in assembling the members is unnecessary. In other words the tightening of the binder ring serves to effect the proper relation between the members or sections and insure their proper location without special attention on the part of the operator, so that projecting edges of joining members or sections are eliminated. Moreover by affording a depth of seat or channel 19 somewhat in excess of the depth of the inwardly tapered portion of the binder ring as indicated in Fig. 2, so as to permit of a space to provide for the inward adjustment of the binder ring, any wearing of the contact surface of the ring or the walls of the seat or channel is compensated for and substantial binding action of the ring upon the rim members is always possible.

Obviously the breaking down or disassembling of the core may be effected simply by loosening the binder bolts and dis-mounting the binder ring whereupon the wedge of guide member 11 may be withdrawn to permit of the collapse of the main members of the core as in ordinary members.

The fact that the alinement of the core members or sections is insured by the engagement of the binder ring therewith guards against the possibility of any projecting edge or surface on the head of the core after the parts have been assembled and hence avoids injury to the hands of the workmen in laying on the tire elements and during the rotation of the core incident to the building operation.

An additional advantage of the construction described rests in the fact that the assembling and disassembling of the core members may be effected with ease and rapidity and that the number of small parts necessary to be handled in this connection is minimized with practically the only possibility of the necessity for the renewal of a bolt in the event that it should become damaged or rendered ineffective by the stripping of the threads. The angle of divergence of the side walls of the channel 19 is comparatively large—that is, it is sufficient to preclude any binding frictional engagement between the beveled edges of the binder ring and the side walls of the channel. Friction means for securing the binder ring in place has been heretofore employed and it is one of the purposes of the present invention to overcome the objections incident to the use of such construction. The provision of a channel having side walls disposed at a wide angle of convergence, while it necessitates the use of fastening devices in connection with the binder ring, makes always for the ready separation of the binder ring from the core sections and always permits the binder ring to function in the manner of a cam to properly aline the core sections when the fastening devices are being tightened up.

The invention having been described, what is claimed as new and useful is:—

1. A knock-down tire core consisting of separable members or sections having a composite rim, a binder ring, and bolts connecting the binder ring to said rim, the rim being provided with an annular seat or channel having convergent inner and outer walls and the ring being transversely tapered and having inner and outer convergent bearing surfaces in contact respectively with the walls of the said seat or channel.

2. A knock-down tire core consisting of separable sections having camming surfaces disposed at a wide angle of convergence, and a binder ring provided with means for securing the same to the sections and having corresponding complemental cam bearing surfaces.

3. A knock-down tire core consisting of separable sections provided with annular cam bearing surfaces disposed at a wide angle of convergence, and a binder ring provided with separate fasteners for securing the same to said sections, the said ring having corresponding complemental cam bearing surfaces.

4. A knock-down tire core consisting of separable sections recessed to form when the sections are in assembled relation a channel the opposite side walls of which are disposed at a wide angle of convergence, a binder ring cross sectionally shaped to correspond with said channel, a fastening means for securing said ring to each of the sections of the core.

5. A knock-down tire core consisting of separable sections recessed to form when the sections are in assembled relation a channel having widely divergent side walls, and a binder ring cross sectionally shaped to correspond with said channel and provided with means for securement to each of the sections, the narrow side face of the ring being of greater width than the width at the bottom of the channel to permit contact between the slanting edges of the ring and corresponding sides of the channel despite the wear on the same.

In testimony whereof he affixes his signature.

EDWARD GIDEON RUPERT.